(Model.)

C. C. KRIBS.
MILK SKIMMER.

No. 282,093. Patented July 31, 1883.

WITNESSES:
Chas. Nida
C. Sedgwick

INVENTOR:
C. C. Kribs
BY Munn & Co
ATTORNEYS.

UNITED STATES PATENT OFFICE.

CHARLES C. KRIBS, OF TREMPEALEAU, WISCONSIN.

MILK-SKIMMER.

SPECIFICATION forming part of Letters Patent No. 282,093, dated July 31, 1883.

Application filed October 9, 1882. (Model.)

*To all whom it may concern:*

Be it known that I, CHARLES C. KRIBS, of Trempealeau, in the county of Trempealeau and State of Wisconsin, have invented a new and Improved Milk-Skimmer, of which the following is a full, clear, and exact description.

The object of my invention is to provide a new and improved skimming attachment for creaming-pans, wherewith the skimming of milk is greatly facilitated.

The invention consists in the construction and combination of parts forming a milk-skimmer, hereinafter described and claimed.

Reference is to be had to the accompanying drawings, forming part of this specification, in which similar letters of reference indicate corresponding parts in both the figures.

Figure 1:
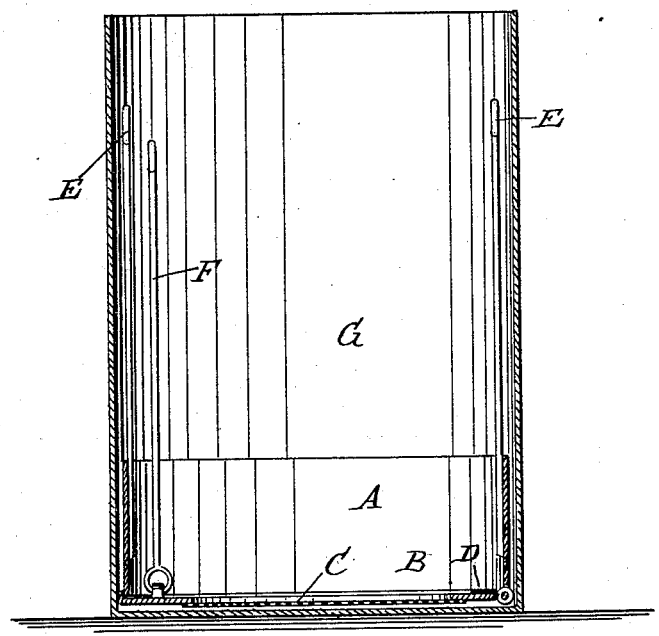
Figure 2:
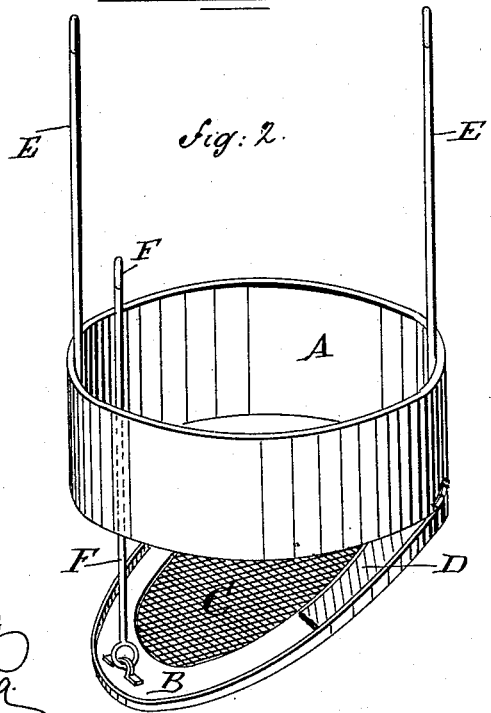

Figure 1 is a cross-sectional elevation of a creaming-pan provided with my improved skimmer. Fig. 2 is a perspective view of my improved skimmer, showing the strainer-bottom lowered.

To the short cylindrical vessel A is hinged a circular frame or bottom, B, which is filled in with a sieve or strainer, C, made of perforated sheet metal, or of netting or woven wire. A packing-band, D, preferably made of rubber, rests on the upper surface of the bottom frame, B, so that the same will form a close joint with the bottom of the cylindrical vessel. Two upright handle-wires, E, project upward from the vessel A, and a handle-wire, F, is hinged to the upper surface of the hinged bottom frame, B, and is used to raise and lower the same, or swing it toward or from the lower edge of the vessel A.

If desired, a spring may be provided to hold the bottom frame, B, shut against the lower edge of the vessel A, and the handle F can then be dispensed with.

The above-described skimmer is placed into the botton of the milk-can G, and after a suitable time it is raised and all the cream will be contained therein. The milk can drip off from the cream through the apertures in the strainer. To remove the cream from the skimming-vessel A, the strainer-bottom B is swung downward by means of the handle F or some other suitable device.

The strainer-bottom may be made concave or flat, and the vessel A may be made straight or flaring. The vessel A is to be gaged, so that the quantity of cream therein will always be indicated. The bottom strainer-frame can be made fixed or removable.

Having thus described my invention, I claim as new and desire to secure by Letters Patent—

In a milk-skimmer constructed substantially as herein described, the open-bottomed vessel A, the vertical handles E, secured thereto, the perforated bottom B, hinged thereto, the strainer C, covering said perforation, the elastic packing-ring D upon said bottom, between the same and the lower edge of the vessel A, and the handle F, attached to bottom B, all as and for the purpose specified.

CHARLES CRAMER KRIBS.

Witnesses:
E. N. TROWBRIDGE,
T. J. SEYMOUR.